United States Patent [19]
Le et al.

[11] Patent Number: 5,986,847
[45] Date of Patent: *Nov. 16, 1999

[54] METHOD AND APPARATUS FOR PROVIDING READ AND WRITE SKEW OFFSET INFORMATION FOR A MAGNETO-RESISTIVE HEAD

[75] Inventors: Me Van Le, Milpitas; Jong-Ming Lin, Cupertino, both of Calif.

[73] Assignee: Samsung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/732,130

[22] Filed: Oct. 18, 1996

[51] Int. Cl.⁶ .................................................. G11B 5/596
[52] U.S. Cl. ..................................... 360/78.14; 360/77.08
[58] Field of Search .......................... 360/75, 76, 77.01, 360/78.14, 77.08, 48, 53, 77.04

[56] References Cited

U.S. PATENT DOCUMENTS

| | | | |
|---|---|---|---|
| 4,802,033 | 1/1989 | Chi | 360/77.04 |
| 4,982,295 | 1/1991 | Yakuwa et al. | 360/77.04 |
| 5,235,478 | 8/1993 | Hoshimi et al. | 360/77.08 |
| 5,500,776 | 3/1996 | Smith | 360/77.04 |
| 5,587,850 | 12/1996 | Ton-that | 360/77.08 |
| 5,715,105 | 2/1998 | Katayama et al. | 360/53 X |

*Primary Examiner*—Aristotelis M. Psitos
*Assistant Examiner*—K. Wong
*Attorney, Agent, or Firm*—Blakely, Sokoloff, Taylor & Zafman LLP

[57] ABSTRACT

The present invention is a method and apparatus for generating a skew or position offset signal for aligning the read element of an magneto-resistive (MR) head with the centerline of written data, during a read operation. The disk has a plurality of tracks each of which are divided into sectors. Two adjacent tracks are first erased and a calibration burst is written in the odd sectors, for example, the first and third sectors of one of the tracks. A calibration burst is also written in the even sectors, such as the second and fourth sectors of the adjacent track. Without adjusting the position of the MR head, the value of the calibration burst on the latter track is read. Since the read element is offset from the write element, it can read the values of the calibration bursts on the odd sectors of one track and the values of the calibration bursts on the even sectors of the other track. The average values of calibration bursts, $E_{oddave}$ and $E_{evenave}$ are obtained. An offset value corresponding to $E_{oddave}-E_{evenave}=0$ is obtained and an offset signal corresponding to this offset value is generated. A servo operation is then performed to align the center of the read element with the centerline of the written data. Alternatively, the value of the calibration burst $E_{odd}$ in the first odd sector, and the value of the calibration burst $E_{even}$ may be read to obtain an offset value corresponding to $E_{odd}-E_{even}=0$.

22 Claims, 11 Drawing Sheets

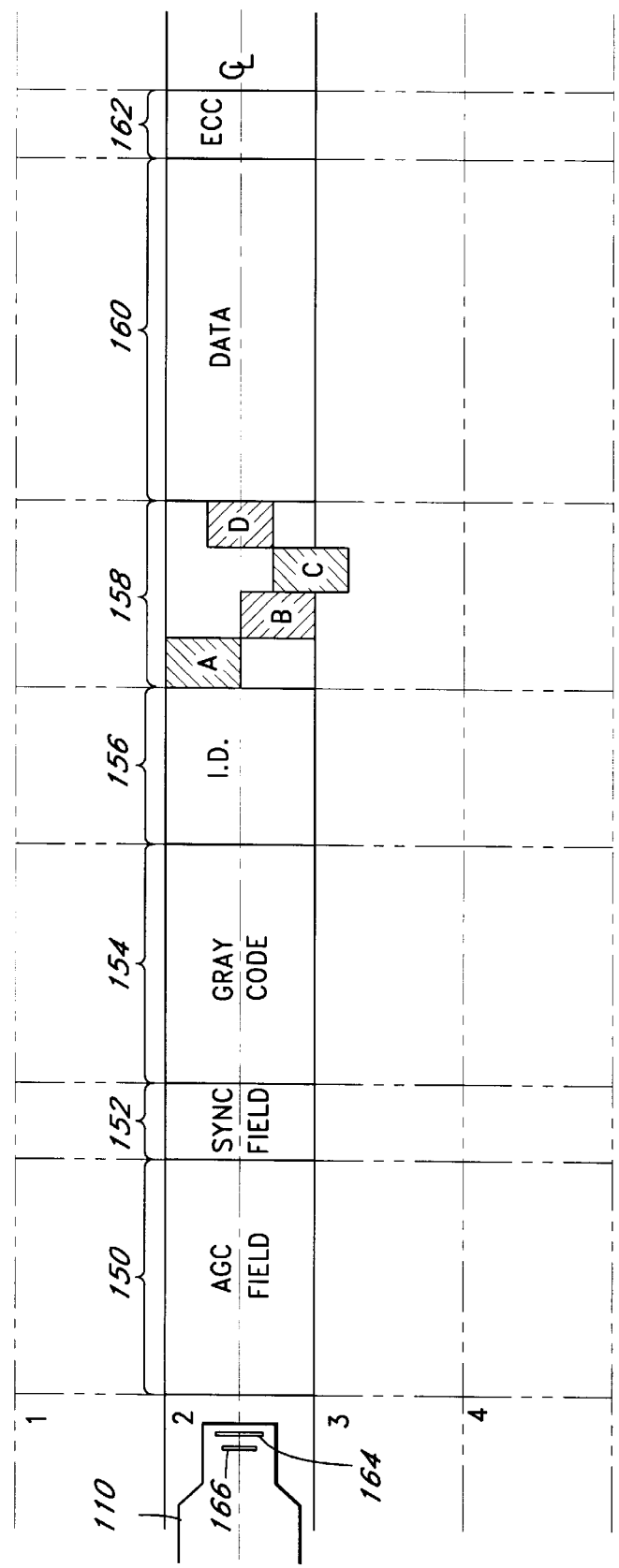

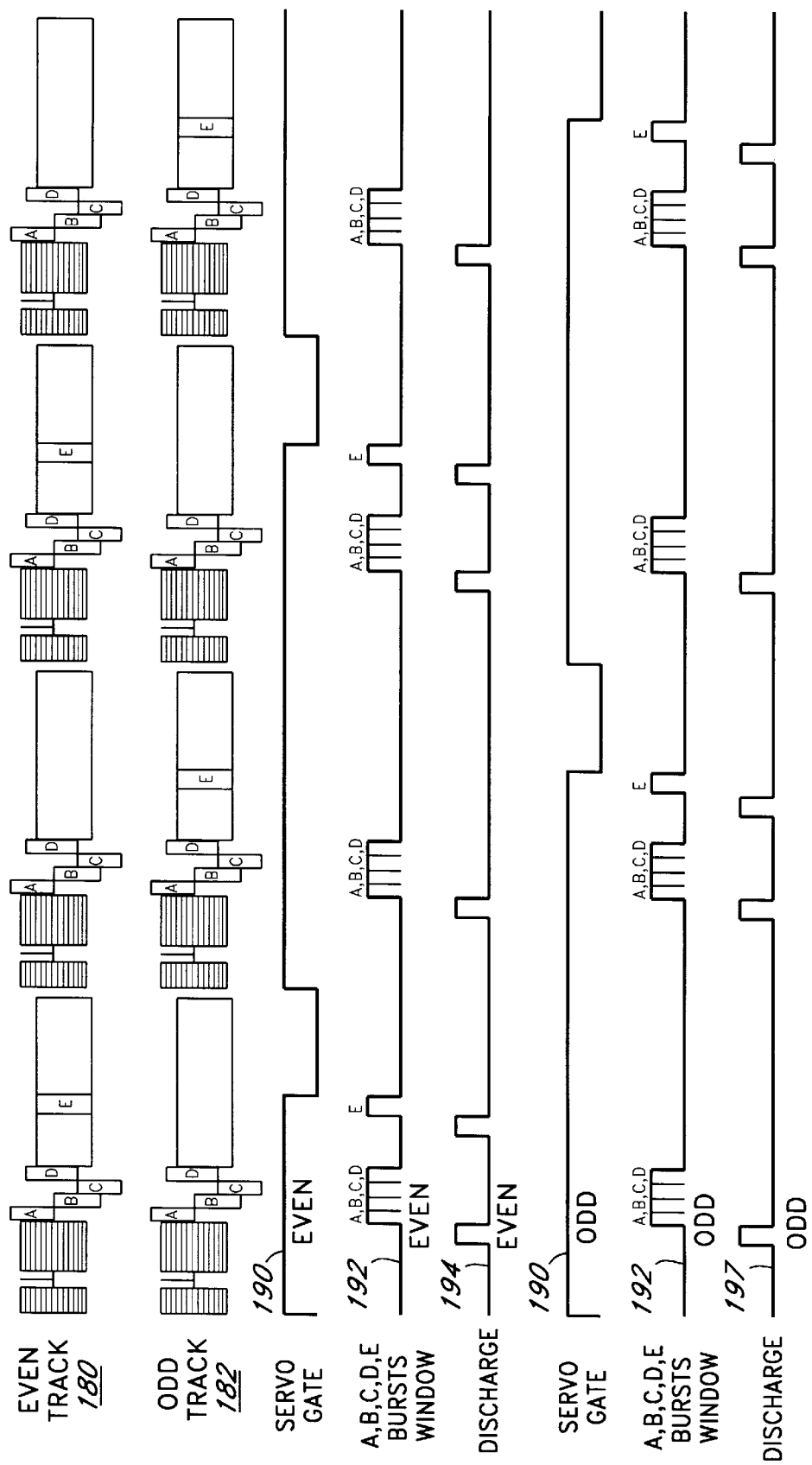

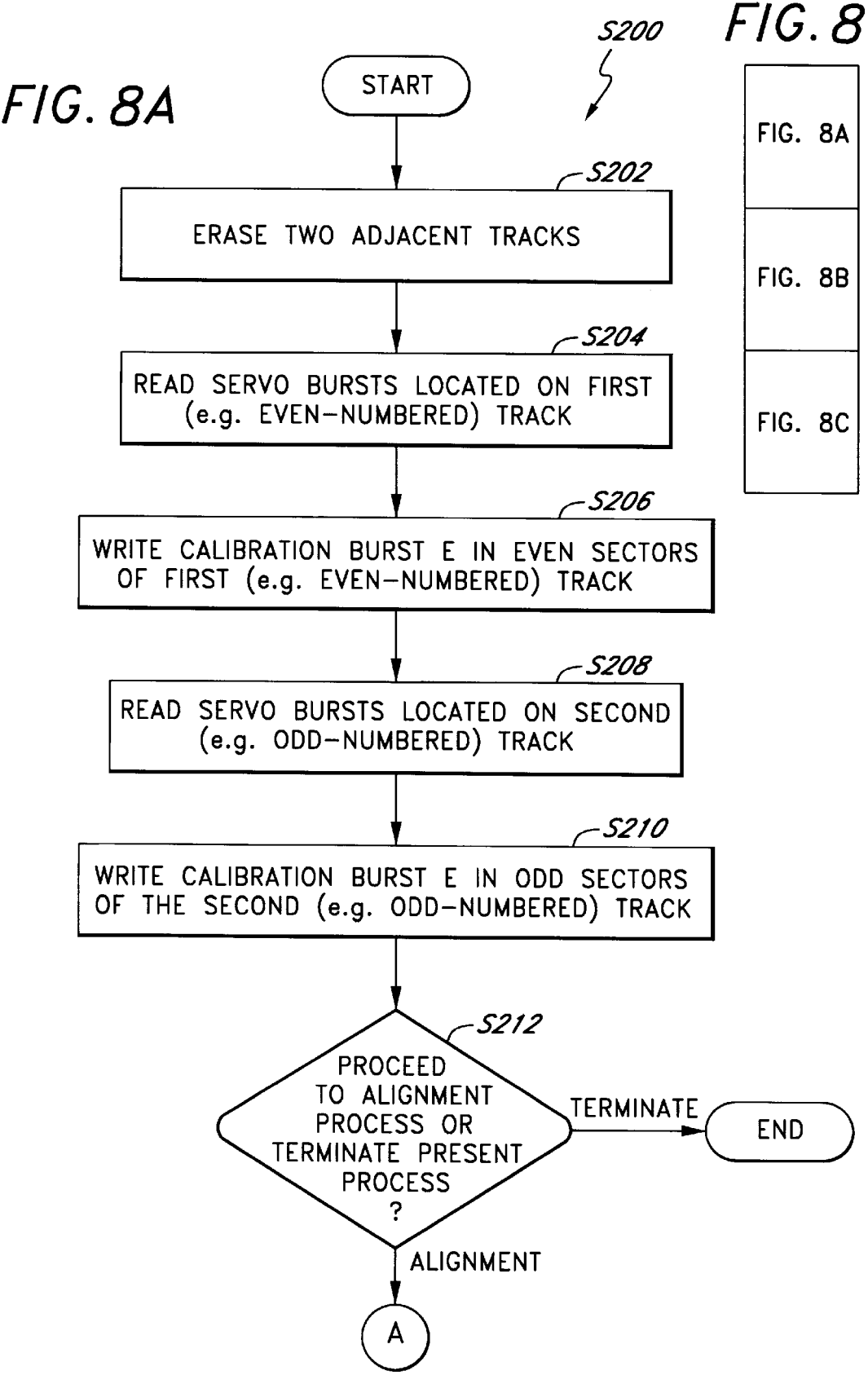

METHOD AND APPARATUS FOR PROVIDING READ AND WRITE SKEW OFFSET INFORMATION FOR A MAGNETO-RESISTIVE HEAD

BACKGROUND OF THE INVENTION

1. Field of the Invention

The present invention relates in general to disk storage systems and more particularly, to a method and apparatus for providing skew offset information for aligning the read element of a magneto-resistive (MR) head with the centerline of written data during a read operation.

2. Description of the Related Art

Disk drives are magnetic recording devices used for the storage of information. The information is recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information.

To accurately write and read data, it is desirable to maintain the head on the center of the track. To assist in controlling the position of the head, each sector of the disk typically contains a number of servo bits accurately located relative to the centerline of the track. The signals produced by the servo bits are typically demodulated into position offset signals which are used to determine the position of the head relative to the track, and to move the actuator arm if the head is not located on the track centerline.

There has been developed a dual element transducer which includes a single write element and a separate read element which is constructed from a magneto-resistive material. Such dual element transducers are commonly referred to as magneto-resistive (MR) heads.

Because of manufacturing tolerances, the separate magneto-resistive read element may be off-center from the write element of the head. Therefore, if data is written off the center of the track, to read the data, the servo system must move the head slightly off-center so that the read element is centered with the written data.

Additionally, while the read and write elements may be aligned when the head is positioned over a particular track, when the head is moved to another track, the read element may no longer be aligned with the write element. For example, as shown in FIGS. 1A and 1B, when the head is positioned over a track along the outer diameter of the disk, the centers of the read and write elements (R and W respectively) are aligned. However, as shown in FIGS. 2A and 2B, when the head is positioned over a track along the inner diameter of the disk, the centers of the read R and write W elements are no longer aligned. The servo system must move the head slightly off-center, so that the read element R is centered with the written data. The routine of moving an MR head during a read operation is commonly referred to as micro-jogging.

It also has been determined that the skew offset information for an MR head located over the inner tracks of a disk is different from that of an MR head located over the outer tracks of a disk. In addition, such MR head skew offset information is typically nonlinear, and it also generally varies greatly between heads.

One approach in solving this problem is described in U.S. patent application Ser. No. 08/641,686 entitled "Method and Apparatus for providing Read and Write Skew Offset Information for a Magneto-Resistive Head," filed on May 1, 1996 and which is assigned to the assignee of the present invention. U.S. patent application Ser. No. 08/641,686 describes a method and apparatus for generating a skew or position offset signal for aligning the read element of an MR head with the centerline of written data, during a read operation. The disk has a plurality of tracks, one of which contains a calibration burst that allow the read element to be centered with the centerline of written data. This is accomplished by first writing the calibration burst on a predetermined number of sectors of the track. A profile of the calibration burst is obtained by micro-jogging the head from a first position that is −50% from the track centerline to a second position that is +50% from the track centerline, and sensing the magnitude of the calibration burst in various increments between the first and the second positions. For each microjogging position, the magnitude of the calibration burst is obtained. The microjogging position corresponding to the peak value of the calibration burst represents the offset between the read and the write elements. The offset signal is stored in memory and used in a servo routine to center the MR head during a read operation. The calibration burst may be included in a single track, a predetermined number of tracks, or on every track of the disk.

Through the implementation of the apparatus and method described in U.S. patent application No. 08/641,686 the read element of an MR head may be accurately aligned with the centerline of written data during a read operation. The microjogging process utilized in the technique described in U.S. patent Ser. No. 08/641,686 typically requires a minute. In establishing calibration bursts over four different sets of tracks on a disk, the technique described in U.S. patent application Ser. No. 08/641,686 may take up to 4 or 5 minutes.

Accordingly, there is a need in the technology for a method and apparatus for providing skew offset information used in the alignment of a magneto resistive head so that a read element of an MR head may be aligned with the centerline of written data during a read operation. It is desired that such alignment be provided in an efficient manner.

BRIEF SUMMARY OF THE INVENTION

The present invention is a method and apparatus for generating a skew or position offset signal for aligning the read element of an magneto-resistive (MR) head with the centerline of written data, during a read operation. The disk has a plurality of tracks each of which are divided into sectors. Two adjacent tracks are first erased and a calibration burst is written in the odd sectors, for example, the first and third sectors of one of the tracks. A calibration burst is also written in the even sectors, such as the second and fourth sectors of the adjacent track. Without adjusting the position of the MR head, the value of the calibration burst on the latter track is read. Since the read element is offset from the write element, it can read the values of the calibration bursts on the odd sectors of one track and the values of the calibration bursts on the even sectors of the other track. The average values of calibration bursts, $E_{oddave}$ and $E_{evenave}$ are obtained. An offset value corresponding to $E_{oddave} - E_{evenave} = 0$ is obtained and an offset signal corresponding to this offset value is generated. A servo operation is then performed to align the center of the read element with the centerline of the written data. Alternatively, the value of the calibration burst $E_{odd}$ in the first odd sector, and the value of the calibration burst $E_{even}$ may be read to obtain an offset value corresponding to $E_{odd}-E_{even}=0$. An offset signal corresponding to this offset value may then be generated and used to align the read element. The offset signal may also be stored in memory and used at a later time in a servo routine to center the MR head during a read operation. The calibration bursts may be included in a single set of two tracks, a predetermined number of sets of two tracks, or on every track of the disk.

BRIEF DESCRIPTION OF THE DRAWINGS

FIG. 5 illustrates a data sector of a disk.

FIG. 7A illustrates a timing diagram of the servo burst writing sequence used in calibrating the offset values between the read and write elements in a magneto resistive head, in accordance with the teachings of the present invention.

DETAILED DESCRIPTION OF THE INVENTION

Figure 1A:
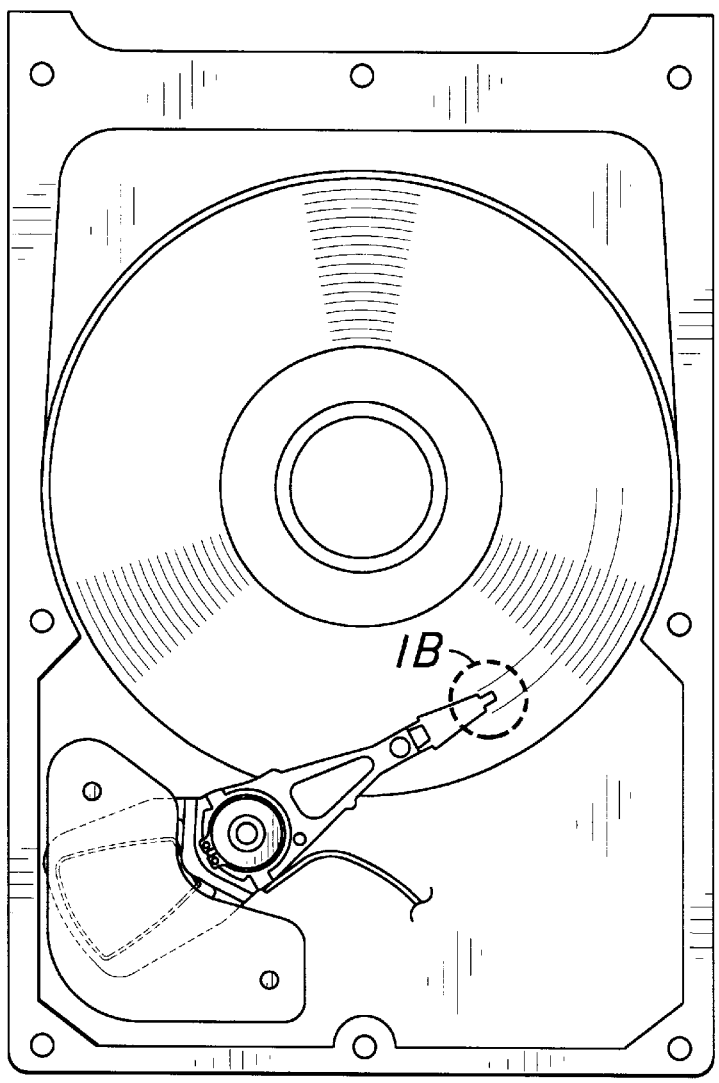
FIG. 1A illustrates a read/write head positioned over a track along the outer diameter of a disk of the prior art.
Figure 1B:
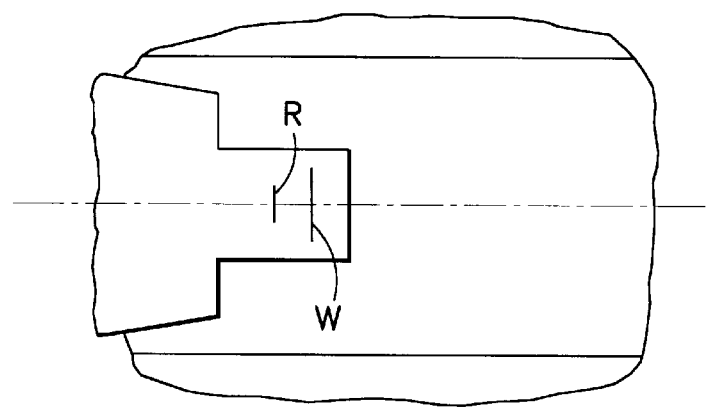
FIG. 1B is an enlarged view of the read/write head of FIG. 1A, illustrating the relative positions of a read element that is aligned with a write element on a typical magneto resistive head, in the prior art.
Figure 2A:
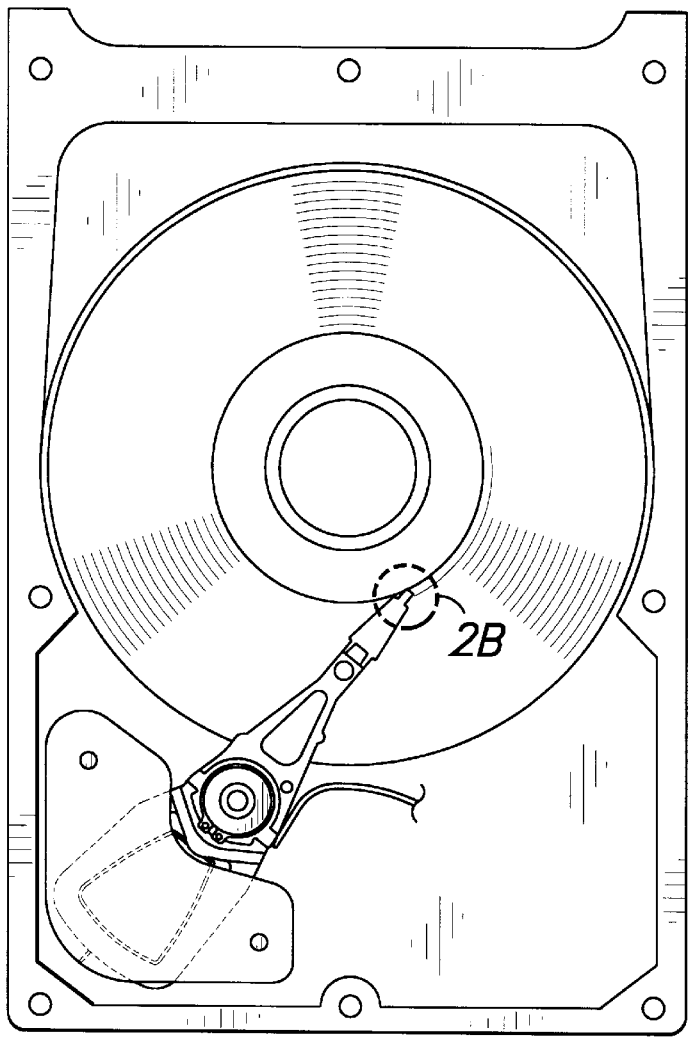
FIG. 2A illustrates a read/write head positioned over a track along the inner diameter of a disk of the prior art.
Figure 2B:
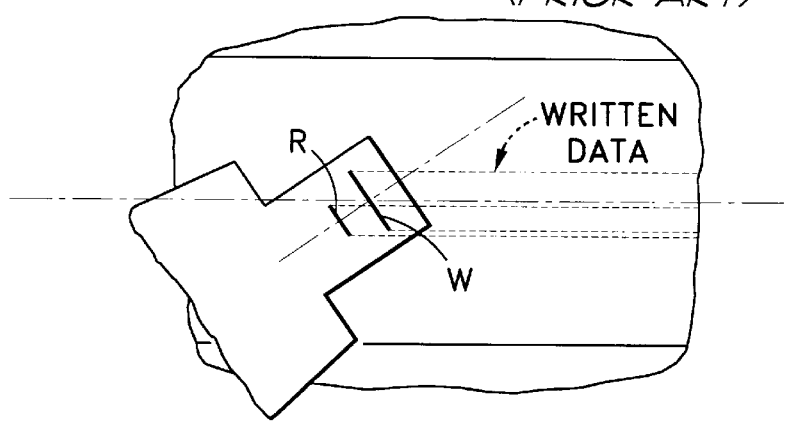
FIG. 2B is an enlarged view of the read/write head of FIG. 2A, illustrating the relative positions of a read element that is misaligned with the write element on a typical magneto resistive head, in the prior art.
Figure 3:
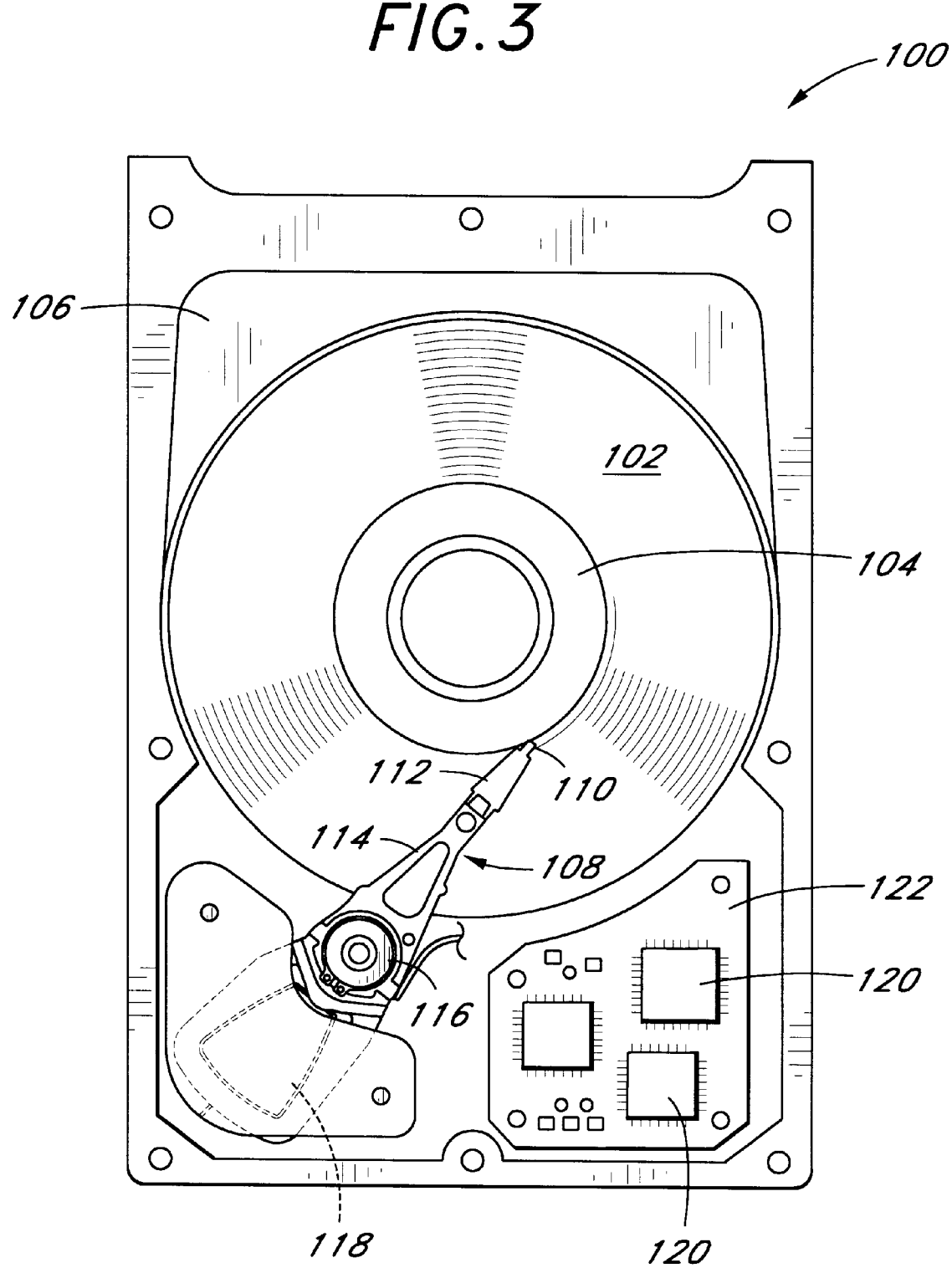
FIG. 3 illustrates a hard disk drive which utilizes the method of the present invention.

Referring to the drawings more particularly by reference numbers, FIG. 3 shows a hard disk drive 100. The disk drive 100 includes a disk 102 that is rotated by a spin motor 104. The spin motor 104 is mounted to a base plate 106. Also mounted to the base plate 106 is an actuator arm assembly 108. The actuator arm assembly 108 includes a number of heads 110 mounted to corresponding flexure arms 112. The flexure arms 112 are attached to an actuator arm 114 that can rotate about a bearing assembly 116. The assembly 108 also contains a voice coil motor 118 which moves the heads 110 relative to the disk 102. There is typically a single head for each disk surface. The spin motor 104, voice coil motor 118 and the heads 110 are coupled to a number of electronic circuits 120 mounted to a printed circuit board 122. In the following discussion, only one head 110 is referenced. The electronic circuits 120 typically include a read channel chip, a microprocessor-based controller and a random access memory (RAM) device.

Figure 4:
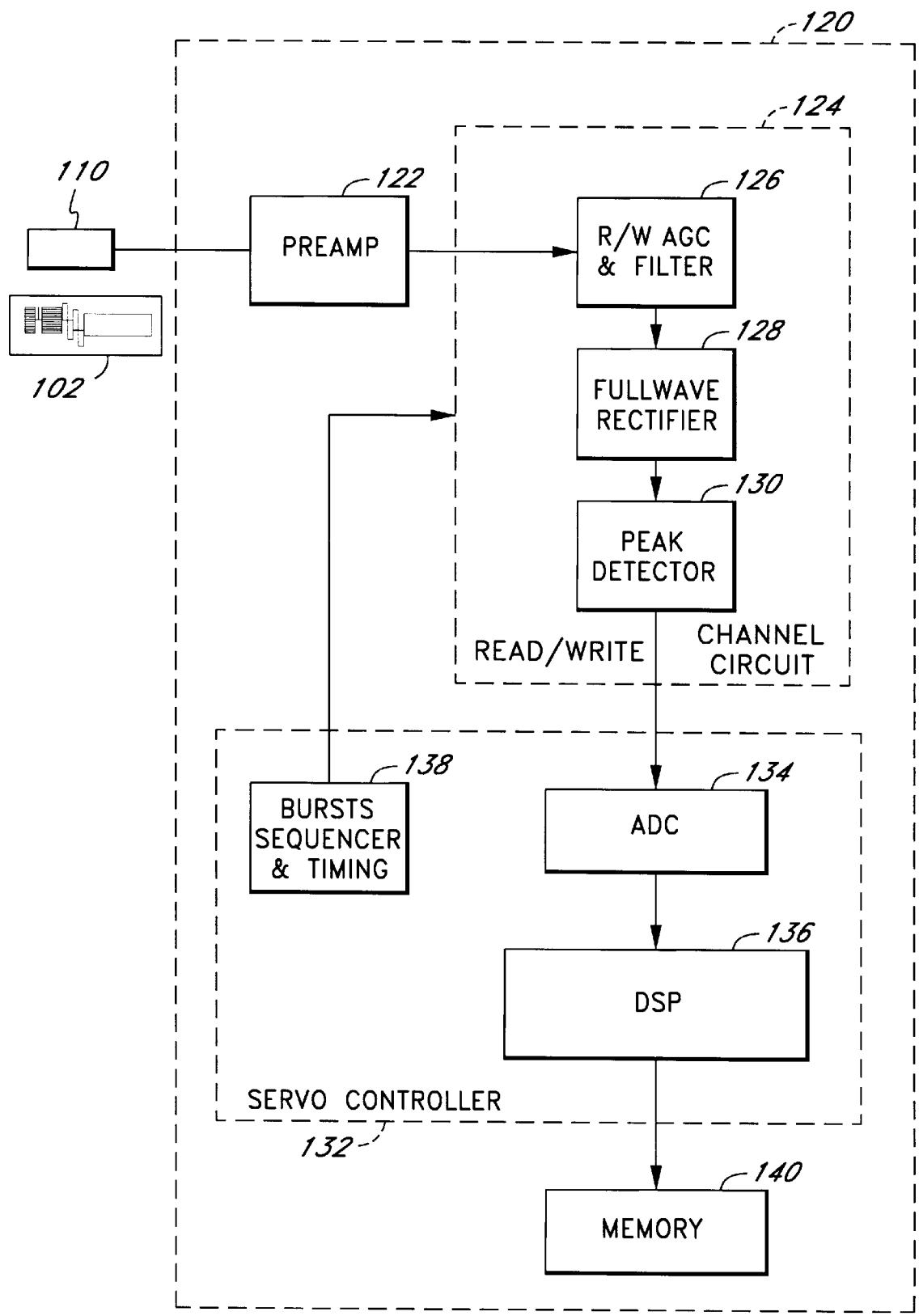
FIG. 4 is a block diagram of an integrated circuit read channel in accordance with the present invention.

FIG. 4 is a block diagram of one of the electronic circuits 120 of FIG. 3. The electronic circuit 120 includes a preamplifier 122 which is coupled to a read/write (R/W) channel circuit 124. The read/write channel circuit 124 includes a R/W Automatic Gain Control (AGC), a filter circuit 126, a fullwave rectifier 128 and a peak detector 130. The electronic circuit 120 further comprises a microprocessor-based servo controller 132 which includes an analog-to-digital converter (ADC) 134, a digital signal processor 136 and a burst sequencer and timing circuit 138. In addition, the electronic circuit 120 includes a random access memory (RAM) device 140.

The electronic circuit 120 is coupled to one of the magnetic heads 110 which senses the magnetic field of a magnetic disk 102. When reading the servo information located in the servo field region 158 (See FIG. 5) on the disk 102, the head 110 generates a read signal that corresponds to the magnetic field of the disk 102. The read signal is first amplified by the preamplifier 122, and then provided to the R/W channel circuit 124. The AGC data included in the read signal is provided to the R/W AGC and filter circuit 126. The AGC data provided by the read signal is monitored by the R/W AGC circuit portion of circuit 126 and the read signal is then filtered by the filter circuit located in the circuit 126. The fullwave rectifier 128 rectifies the read signal and provides the rectified read signal to the peak detector 140. In response, the peak detector 140 detects the amplitude of the read signal. The read signal is then provided to the ADC 134 which provides digitized samples of the analog read signal. The digitized signal is then provided to a digital signal processor 136 which generates the position offset signals based on the servo information read by the head 110, as discussed in detail in the following sections. The values representing the position offset signals are stored in memory 140. The bursts sequencer and timing circuit 138 provide the timing required for the aforementioned processes.

As shown in FIG. 5, data is typically stored within sectors of radially concentric tracks located across the disk 102. A typical sector will have an automatic gain control (AGC) field 150, a synchronization (sync) field 152, a gray code field 154 that identifies the cylinder or track, an identification (ID) field 156 that defines the sector, a servo field 158 which includes a number of servo bits A, B, C, D, a data field 160 which contains the data, and an error correction code field 162. The electronic circuits 120 utilize the servo bits A, B, C and D to maintain the heads 110 on the centerline CL of the track.

The heads 110 can magnetize and sense the magnetic field of the disk 102. In one embodiment, each head 110 has a single write element 164 and a separate read element 166 as shown in FIG. 5. The read element 166 is preferably constructed from a magneto-resistive material which changes resistance in proportion to the intensity of an external magnetic field. The read element 166 is sometimes offset from the write element 164 because of the tolerances associated with the manufacturing process of the head. Additionally, the center of the read element 166 may be offset from the enter of the write element 164 because of the skew angle of the head 110 with respect to the track on the disk 102. If the read element 166 is aligned with the center CL of the track, and the write element 164 is off-set from the read element 166, the data will be written off-center from the center CL of the track. To properly read the data, the read element 164 must be moved over to the off-center location of the written data.

Figures 6A, 6B:
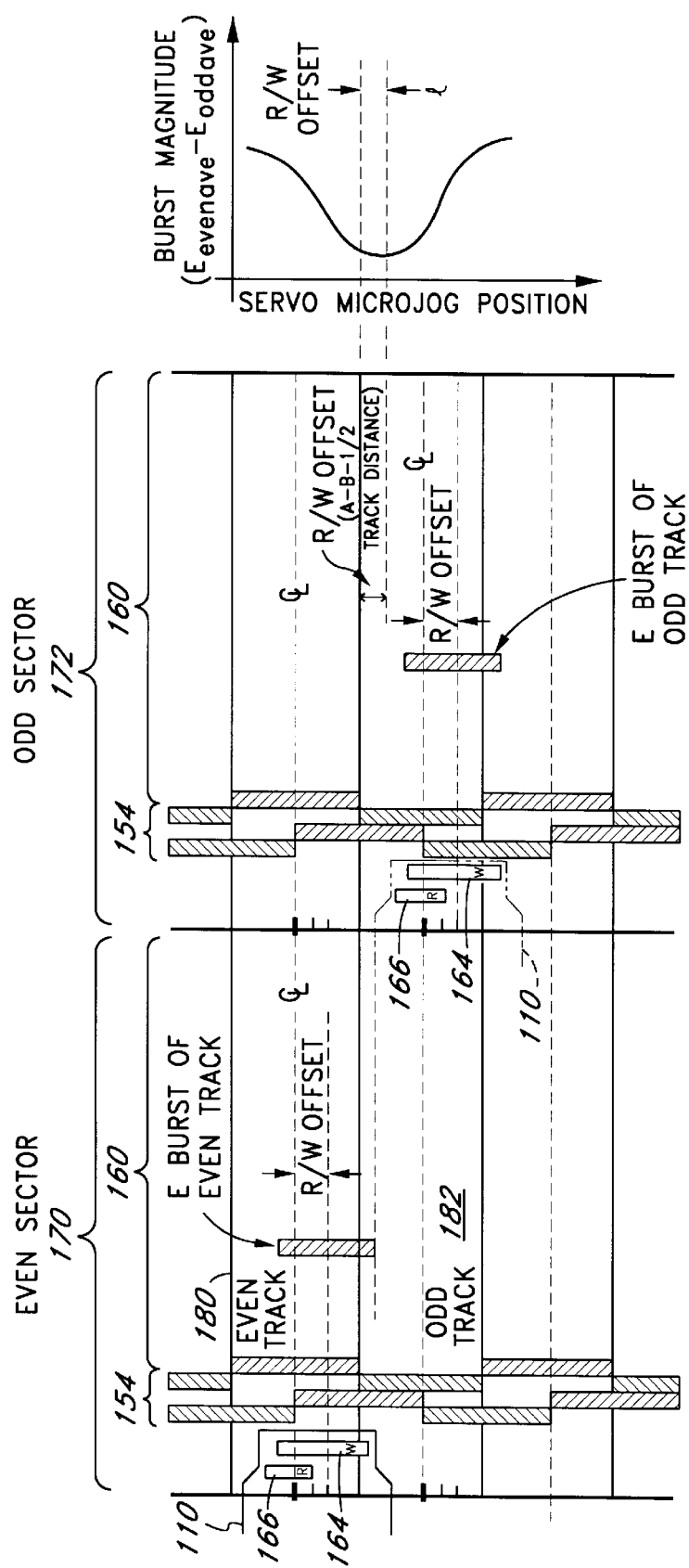
FIG. 6A is an enlarged view of a portion of the data sector of FIG. 5, illustrating the calibration burst utilized in the method of the present invention.
FIG. 6B is a graph illustrating the magnitude of the calibration burst with respect to the position of the read element of a magneto resistive head.

FIG. 6A is an enlarged view of a portion of the data sector of FIG. 5, illustrating the calibration burst E utilized in the method of the present invention. The calibration burst E is located in a calibration field and is used to generate a position offset signal. The calibration field has a calibration field centerline that is offset from the track centerline. In one embodiment, the calibration burst E is written in the data field 160 of every alternate sector 170 on a particular track 180 of the disk 102. The calibration burst E is also written in the data field 160 of every alternate sector 172 of a track 182 adjacent to the track 180. The sector 172 is also adjacent to the sector 170. For example, the calibration burst E may be written on every even sector 170 of an even numbered track 180. The calibration burst E is also written on every odd sector 172 of an odd-numbered track 182 that is adjacent to the track 180. For discussion purposes, each even sector will be referred to as sector 170 and each odd sector will be referred to as sector 172. The calibration bursts E written on the set of adjacent tracks (180, 182) may also be written on every set of two adjacent tracks on the disk or on every predetermined number of sets of tracks on the disk. For example, the calibration bursts E may be written on every fourth set of two adjacent tracks on the disk. The number of sets of tracks on which the calibration bursts E are written may be determined by calibration accuracy requirements.

The servo field 158 in each sector contains a number of servo bits designated A, B, C and D. The boundary formed by the A and B servo bits defines a centerline CL of a track. The center of the C servo bit is aligned with the center CL of the track. The D servo bit is offset 180° from the position of the C servo bit. The servo bits A and B may used to center the read element with the centerline CL of the written data after the offset between the write element 166 and the written data is determined, in accordance with the teachings of the present invention. This is accomplished by detecting the amplitude of the servo bursts provided by servo bits A, B, C and D using the read element 166 of the head 110. If the center of the read element 166 is not aligned with the center of the write element 164 (and thus, the center of the written data), then the servo controller 132 will generate a position offset signal using the technique of the present invention, to move the head 110 so that alignment of the center of the read element 166 with the center of the written data may be accomplished.

The distance that the head 110 has to be moved in such a situation is determined by the offset between the read element 166 and the write element 164 for a particular track. The technique of the present invention determines the magnitude of this offset through the use of a set of two calibration bursts E written on alternate adjacent sectors 170 and 172 of alternate adjacent tracks 180 and 182. The calibration burst E has a centerline located at a predetermined offset position from the track centerline CL. The centerline of the calibration burst E is also the center of the write element 164 since the calibration bursts E are written by the write element 164 during the calibration process of the disk drive while the read element is on the track centerline.

FIG. 6B is a graph illustrating the magnitude of the calibration burst E with respect to the position of the read element 164 of a magneto resistive head. Upon writing the calibration burst E in the required servo sectors, the read element 164 reads the values of the magnitude of the calibration burst E previously written on every sector of the entire track without any adjustment in the position of the head 110. Since the read element 164 is offset from the write element 166, the read element 164 will be able to read the value of the calibration burst E written on the even sectors 170 of the even track 180, as well as the calibration bursts E written on the odd sectors 172 of the odd track 182. An average of the magnitude of the calibration burst E is calculated and stored in memory 140 as $E_{oddave}$. The read element 166 also reads the values of the magnitude of the calibration burst E previously written on every even sector 170 of the next track, which is an odd-numbered track 182. The average of the magnitude of the calibration burst E on the even sectors 170 is obtained and stored as $E_{evenave}$. The relative position offset value 1 is the difference between $E_{oddave}$ and $E_{evenave}$. Using this position offset value, the servo controller 132 may direct the head 110 to align the read element 164 to a position equal to the relative position offset value, or to a position where $E_{oddave}=E_{evenave}$ or $E_{oddave}-E_{evenave}=0$. This routine is repeated for all servo sectors in which a calibration burst E has been written. The position value offset value 1 corresponding to the burst magnitude $E_{oddave}=E_{evenave}$ or $E_{oddave}-E_{evenave}=0$, represents the offset value between the read and write elements 166 and 164, at a particular track location. Upon obtaining the offset value, the servo controller 132 will generate a demodulated position offset signal having an amplitude representative of the position offset value.

FIG. 7A illustrates a timing diagram of the servo burst writing sequence used in calibrating the position offset values between the read and write elements in a magneto resistive head, in accordance with the teachings of the present invention. The bursts sequencer and timing circuit 138 in the servo controller 132 controls the timing cycles for the writing of the calibration burst E on the even sectors 170 on the even-numbered track 180. The timing cycles for the even-numbered track 180 include: a servo gate $190_{EVEN}$, the timing of servo bursts A, B, C, D and E $192_{EVEN}$, and the discharge cycles $194_{EVEN}$ for initiating the servo bursts $192_{EVEN}$. The bursts sequencer and timing circuit 138 in the servo controller 132 also controls the timing cycles for the writing of the calibration burst E on the odd sectors 172 on the odd-numbered tracks 182. The timing cycles for the odd-numbered track 182 include: a servo gate $190_{ODD}$, the timing cycle $192_{ODD}$ of servo bursts A, B, C, D and E, and the discharge cycles $194_{ODD}$ for initiating the servo bursts $192_{ODD}$.

During the writing of the calibration burst E on the even sectors 170 on the even-numbered track 180, servo burst writing is accomplished during the positive pulses of the servo gate $190_{EVEN}$. Within a single cycle of the servo gate $190_{EVEN}$, reading of servo bursts A, B, C and D is initiated at the falling edge of the first discharge pulse $194_{EVEN}$. Writing of the calibration burst E is initiated at the falling edge of the second discharge pulse $194_{EVEN}$. Note that the calibration burst E is only written on each even sector 180. The offset calibration cycles continue until offset calibration for the entire even-numbered track 180 is accomplished.

Similarly, during the writing of the calibration burst E on the odd sectors 172 of the odd-numbered track 182, servo burst writing is accomplished during the positive pulses of the servo gate $190_{ODD}$. Within a single cycle of the servo gate $190_{ODD}$, reading of servo bursts A, B, C and D is initiated at the falling edge of the first discharge pulse $194_{ODD}$. Writing of the calibration burst E is initiated at the falling edge of the second discharge pulse $194_{ODD}$. Note that the calibration burst E is only written on each odd sector 182. The calibration writing cycles will continue until the writing of the calibration bursts E for the entire odd-numbered track 182 is accomplished.

Figure 7B:
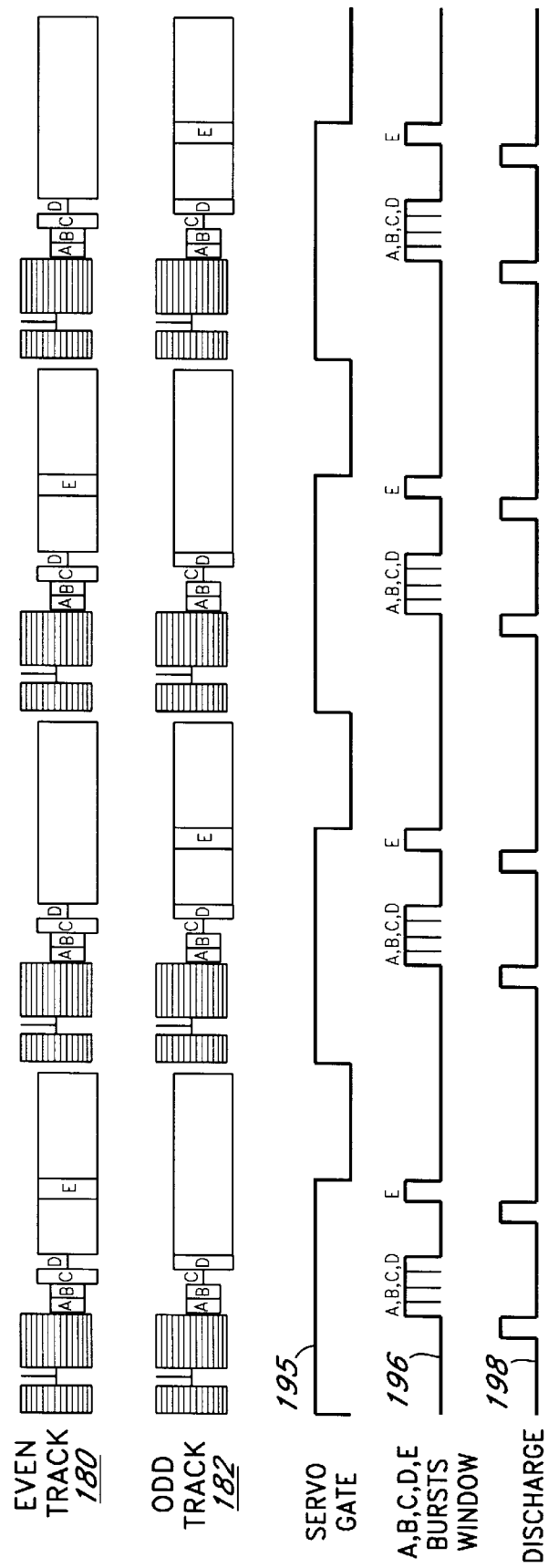
FIG. 7B illustrates a timing diagram of the servo burst reading sequence used in calibrating the offset values between the read and write elements in a magneto resistive head, upon implementing offset calibration, in accordance with the teachings of the present invention.

FIG. 7B illustrates a timing diagram of the servo burst reading sequence of the offset calibration process in accordance with the teachings of the present invention. The servo burst reading sequence is conducted after the calibration bursts E have been written on two adjacent tracks. The bursts sequencer and timing circuit 138 in the servo controller 132 controls the timing cycles for the reading of the calibration burst E on the even and odd sectors 170 and 172 on the even-numbered track 182. The timing cycles for the even-numbered track 182 include: a servo gate 195, the timing cycle 196 of servo bursts A, B, C, D and E, and the discharge cycles 198 for initiating the servo bursts 196.

During the reading of the calibration burst E on the even and odd sectors 170 and 172 on the even-numbered track 182, servo burst reading is accomplished during the positive pulses of the servo gate 195. Within a single cycle of the servo gate 195, reading of servo bursts A, B, C and D located in the even sector 170 is initiated at the falling edge of the first discharge pulse 198. Reading of the calibration burst E located in the even sector 170 is initiated at the falling edge of the second discharge pulse 198. During the next cycle of the servo gate 195, reading of servo bursts A, B, C and D located in the odd sector 172 is initiated at the falling edge of the third discharge pulse 198. Reading of the calibration burst E located in the odd sector 172 is initiated at the falling edge of the fourth discharge pulse 198. In one embodiment, reading of the offset calibration cycles will continue until offset calibration for the entire even-numbered track 182 is accomplished. Alternatively, reading of the offset calibration cycles will proceed for the first two sectors of the even-numbered track 182, after which a servo routine will be conducted to align the read element 166 with the centerline of the written data, as described in detail below.

Figure 8B:
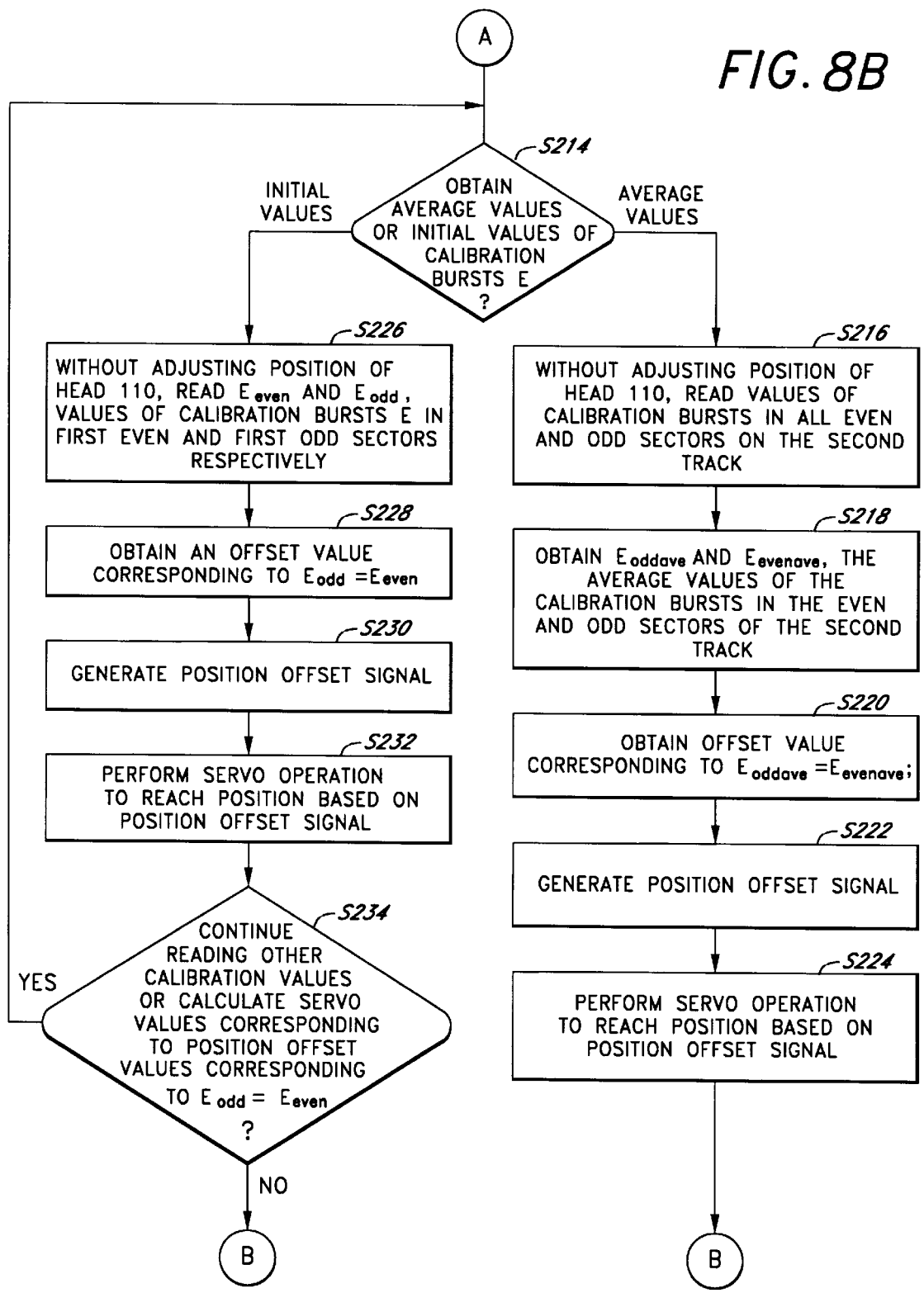
FIG. 8 (which includes FIGS. 8A–8C) is a flowchart illustrating the offset calibration technique of the present invention.
Figure 8C:
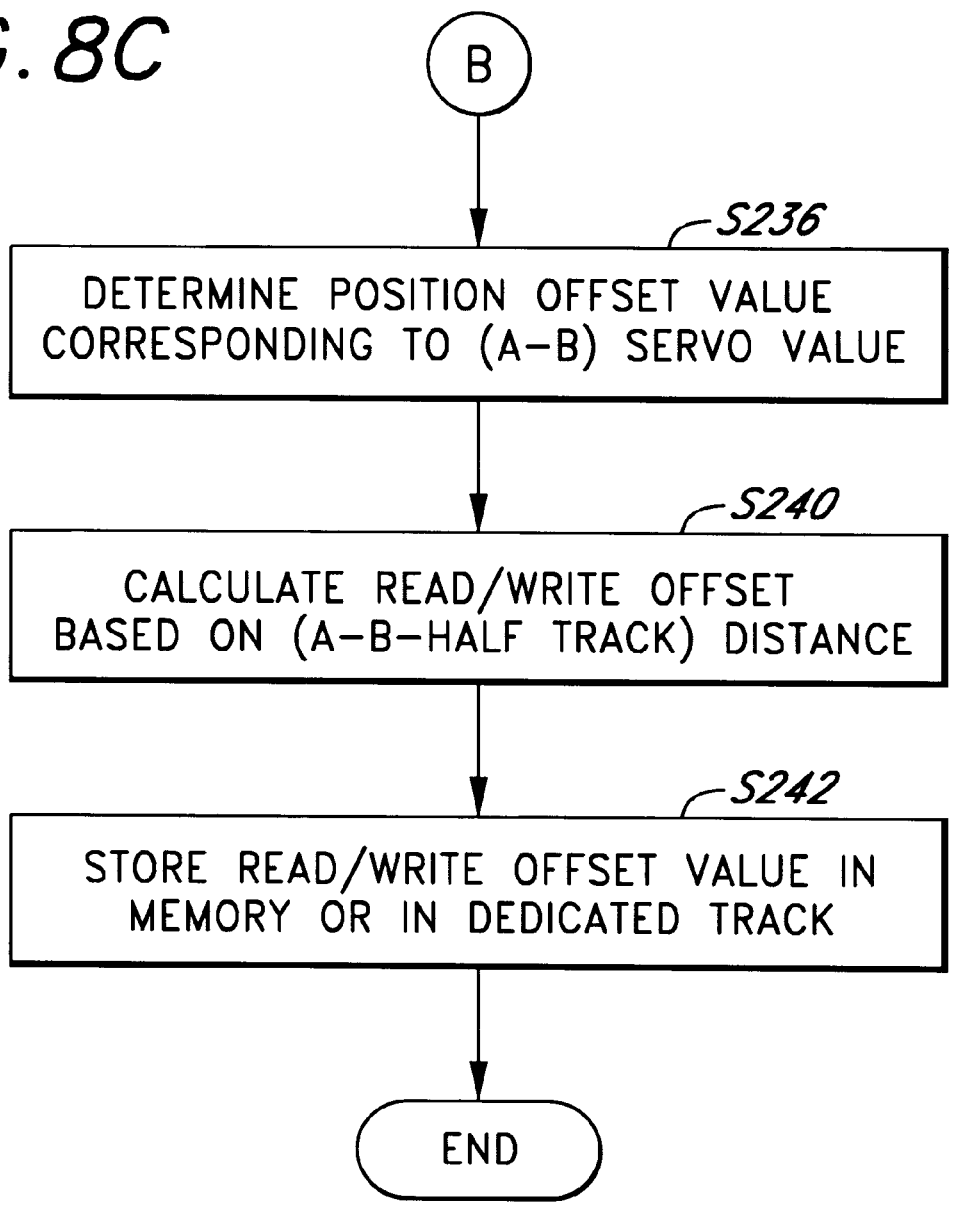

FIG. 8 is a flowchart illustrating the offset calibration process of the present invention. The offset calibration process S200 begins from a start state and proceeds to process step S202, where two adjacent tracks, for example tracks 180 and 182, are first erased. This is typically accomplished by applying direct current to the voice coil in the voice coil motor 118 (FIG. 3), which in turn causes the write element 164 to write over the two adjacent tracks. For present discussion purposes, the second of the two adjacent tracks, for example, an odd-numbered track 182 is first erased, followed by the erasure of the first track, for example, an even-numbered track 180. Then, with the read element 166 reads the servo bursts A, B, C, and D of the first track, for example, even-numbered track 180 upon receiving a control signal (i.e., the falling edge of the discharge pulse 194$_{ODD}$). The servo information obtained is provided to the servo controller 132, which generates a signal for the voice coil to position the write element 164 along the center of the even-numbered track 180. The process S200 then proceeds to write the calibration burst E in the even sectors 170 of the even-numbered track 180, as shown in process step S206.

Next, the process S200 advances to process step S208, where the read element 166 reads the servo bursts A, B, C, and D of the second track, e.g. the odd-numbered track 182 upon receiving a control signal (i.e., the falling edge of the discharge pulse 194$_{EVEN}$). The servo information obtained is provided to the servo controller 132, which generates a signal for the voice coil motor 118 (see FIG. 3) to position the write element 164 along the center of the track 182. The process S200 then proceeds to write the calibration burst E in the required odd sectors 170 of the odd numbered track 182, as shown in process step S210.

The process S200 then proceeds to decision step S212, where it queries if it should proceed to the read element alignment process S200 of the offset calibration process S200 or if it should terminate. If it is determined that it should proceed to read element alignment process S200, the process S200 proceeds to decision step S214, otherwise, it terminates.

At process step S214, the process S200 determines if it should obtain the position offset values based on either the average or the initial values of the calibration bursts E. To obtain the position offset values based on the average values of the calibration bursts E, the process S200 advances to process step S216.

Without adjusting the position of the head 110, the process S200 then obtains the value of the calibration burst E with respect to the center CL of the even-numbered track 180 by sampling the amplitude of the calibration burst E over the first even sector 170 along the odd-numbered track 182, as shown in process step S216. Upon obtaining the value of the calibration burst E on the first even sector 170, the servo controller 132 stores the value of the calibration burst E for the even-numbered track 180 in memory 140. Next, the process S200 samples the amplitude of the calibration burst E in the next sector 172, which is the first odd sector on the odd numbered track 182. This routine is repeated for all servo sectors of the odd-numbered track 182 in which a calibration burst E has been written.

The process S200 then proceeds to process step S218 to calculated $E_{oddave}$ and $E_{evenave}$, the average values of the calibration bursts in the even and odd sectors of the second (odd-numbered) track 182. Next, the process S200 determines the position offset value corresponding to $E_{oddave} = E_{evenave}$, as shown in process step S220.

The position value 1 corresponding to the values of the calibration burst E in the even sector 170 and odd sector 172 represents the offset value between the read and write elements 164 and 166, at a particular track location. The position offset signal should be ideally zero when the read element 166 is centered with the written data. If the read element 166 is off-set from the write element 164 the position offset signal has some non-zero value when the read element is centered over the written data.

Upon obtaining the offset value, the servo controller 132 generates a position offset signal having an amplitude representative of the offset value, as shown in process step S222. The value of the position offset signal corresponding to a particular track and sector may be stored in memory 140 for use during normal operation of the disk drive 100. In one embodiment, the position offset values corresponding to the track number (as identified by gray code) and the ID number (which provides the identification of the sector number) are stored in a table for later referral. Alternatively, the servo controller 132 may perform a servo operation to align the read element 166 with the position corresponding to the position offset values, thereby aligning the read element 166 with the location of written calibration burst E (step S224). In this manner, the read element 166 may be aligned with the centerline of written data.

If, at decision step S214, the process S200 determines that the position offset values should be calculated based on the initial readings of the calibration burst E, the process S200 advances to process step S236.

At process step S226, the read element 166 first reads $E_{even}$, the value of the calibration burst E in the first even sector of the odd-numbered track 182. It then reads $E_{odd}$, the value of the calibration burst E in the first odd sector only the odd-numbered track 182. The offset value corresponding to $E_{odd} = E_{even}$ is then calculated, as shown in process step S228.

Upon obtaining the offset value, the servo controller 132 generates a position offset signal having an amplitude representative of the offset value, as shown in process step S230. The value of the position offset signal corresponding to a particular track and sector may be stored in memory 140 for use during normal operation of the disk drive 100. In one embodiment, the position offset values corresponding to the track number (as identified by gray code) and the ID number (which provides the identification of the sector number) are stored in a table for later referral.

Alternatively, the servo controller 132 may perform a servo operation to align the read element 166 with the position corresponding to the position offset values, thereby aligning the read element 166 with the location of written calibration burst E (step S232). In this manner, the read element 166 may be aligned with the centerline of written data.

The process S200 then proceeds to decision step S234, where it queries if it should continue reading other calibration burst values in other sectors of the track if it should determine the servo values are to the position offset values corresponding to $E_{odd}=E_{even}$.

At process step S236, the process S200 proceeds to determine the position offset value corresponding to the servo value (A-B). This is accomplished by reading the servo value (A-B) corresponding to the position of the read element where $E_{odd}=E_{even}$ or where $E_{oddave}=E_{oddeven}$. The process S200 then calculates the read/write element offset value based on (A-B-half track distance) as shown in process step S240. The read/write element offset value is either stored in memory 140 or a dedicated track, as shown in process step S242. The process S200 then terminates.

The disk drive 100 typically goes through the routine of generating the position offset values after each "power-on" sequence of the drive. Alternatively, the position offset values can be generated when the disk drive 100 is initially assembled and then stored in a non-volatile memory medium such as the disk 102. In a further embodiment, the position offset values may be stored in dedicated tracks of the disk. Through the use of the present invention, the skew or position offset information used in the alignment of a read element of an MR head may be provided, so that the read element of an MR head may be accurately aligned with the centerline of written data during a read operation.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. A hard disk drive, comprising:

a disk including a first track having a first sector and a first track centerline, and a second track adjacent to the first track, the second track having a second sector and a second track centerline, said first track having a first servo field and a first calibration field located in the first sector, with a calibration field centerline that is offset from the first track centerline, said second track having a second servo field and a second calibration field located in the second sector, with a calibration field centerline that is offset from the second track centerline;

a head including a write element and a read element, said read element to read a first calibration field value from the first calibration field and a second calibration field value from the second calibration field while the read element is aligned with the second track centerline; and a circuit to determine a position offset signal as a function of the first calibration field value and the second calibration field value.

2. The disk as recited in claim 1, wherein said first one of said sectors is adjacent to said second one of said sectors.

3. The disk as recited in claim 1, wherein said first calibration field and said second calibration field each includes a calibration burst that is used to generate the position offset signal.

4. The disk as recited in claim 1, wherein said first one of said tracks includes a first data field, said first calibration field being located in said first data field, and said second one of said tracks includes a second data field, said second calibration field being located in said second data field.

5. The disk as recited in claim 1, wherein said first servo field and said second servo field each contains a set of servo bits including an A bit and a B bit that have a common boundary located at the track centerline.

6. A hard disk drive, comprising:

a housing;

a spin motor mounted to said housing;

a disk attached to said spin motor, said disk including a first track having a first sector and a first track centerline, and a second track adjacent to the first track, the second track having a second sector and a second track centerline, said first track having a first servo field and a first calibration field located in the first sector, with a calibration field centerline that is offset from the first track centerline, said second track having a second servo field and a second calibration field located in the second sector, with a calibration field centerline that is offset from the second track centerline;

an actuator arm mounted to said housing;

a head mounted to said actuator arm, said head including a write element and a read element, said read element to read a first calibration field value from the first calibration field and a second calibration field value from the second calibration field while the read element is aligned with the second track centerline; and a circuit to determine a position offset signal as a function of the first calibration field value and the second calibration field value.

7. The hard disk drive as recited in claim 6, wherein said first one of said sectors is adjacent to said second one of said sectors.

8. The hard disk drive as recited in claim 6, wherein said first calibration field and said second calibration field each includes a calibration burst that is used to generate the position offset signal.

9. The hard disk drive as recited in claim 6, wherein said first one of said tracks includes a first data field, said first calibration field being located in said first data field, and said second one of said tracks includes a second data field, said second calibration field being located in said second data field.

10. The hard disk drive as recited in claim 6, wherein said first servo field and said second servo field each contains a set of servo bits including an A bit and a B bit that have a common boundary located at the track centerline.

11. The hard disk drive as recited in claim 6, wherein said head includes a write element and a separate magnetoresistive read element.

12. A method for calibrating an offset between a read element and a write element of a head in a hard disk drive, comprising:

providing a disk having a first track and a second adjacent track, each track having a centerline, said disk having a first sector and a second adjacent sector;

writing a first calibration burst having a first calibration burst value in a first calibration field located on the first track, said first calibration field having a calibration field centerline that is offset from the centerline of said first track, said calibration field being located in the first sector;

writing a second calibration burst with a second calibration burst value in a second calibration field located on the second track, said second calibration field having a calibration field centerline that is offset from the centerline of said second track, said second calibration field being located in the second sector;

reading the first calibration burst value and the second calibration burst value while the write element is aligned along the calibration field centerline of the second track; and generating a position offset signal in response to the first calibration burst value and the second calibration burst value, said position offset signal having an offset amplitude.

13. The method as recited in claim 12, further comprising:
storing said position offset signal amplitude in a memory device.

14. The method as recited in claim 12, further comprising:
moving the read element in accordance to the position offset signal amplitude.

15. The method as recited in claim 12, wherein said second track has a track width value and a servo field containing a set of servo bits including an A bit and a B bit that have a common boundary located at the track centerline, the A bit and the B bit each having a value, and wherein the method further comprises:

reading the value of the A bit and the value of the B bit in the servo field corresponding to a position of the read element where the first calibration burst value is equal to the second calibration burst value;

generating a servo position value based on the difference between the value of the A bit and the value of the B bit;

generating a servo position offset value based on the difference between the servo position value and half the track width value of the second track; and storing the servo position offset value in a memory device.

16. The method as recited in claim 15, further comprising:
moving the read element in accordance with the servo position offset value.

17. A method for calibrating an offset between a read element and a write element of a head in a hard disk drive, comprising:

providing a disk having a first track and a second adjacent track, each track having a centerline, said disk having a first sector, a second sector adjacent to the first sector, a third sector and a fourth sector, the third sector being adjacent to the second and the fourth sectors;

writing a first and a second calibration burst having a first and a second calibration burst value respectively in a first and a second calibration field located on the first track, the first and second calibration field being located in the first sector and the third sector respectively, said first and second calibration fields each having a calibration field centerline that is offset from the track centerline of the first track;

writing a third and a fourth calibration burst having a third and a fourth calibration burst value respectively in a third and a fourth calibration field located on the second track, the third and fourth calibration fields being located in the second sector and the fourth sector respectively, the third and fourth calibration fields each having a calibration field centerline that is offset from the track centerline;

reading the first, the second, the third and the fourth calibration burst values while the write element is aligned along the calibration field centerline of the second track;

obtaining an average of the first and second calibration burst values to provide a first average value, and an average of the third and fourth calibration burst values to provide a second average value;

generating a position offset signal corresponding to a position of the read element where the first average value is equal to the second average value, said position offset signal having an offset amplitude.

18. The method as recited in claim 17, wherein the first and the third sectors are even sectors and wherein the second and fourth sectors are odd sectors.

19. The method as recited in claim 17, wherein the first and the third sectors are odd sectors and wherein the second and fourth sectors are even sectors.

20. The method as recited in claim 17, further comprising:
storing said position offset signal amplitude in a memory device.

21. The method as recited in claim 19, wherein said second track has a track width value and a servo field containing a set of servo bits including an A bit and a B bit that have a common boundary located at the track centerline, the A bit and the B bit each having a value, and wherein the method further comprises the steps of:

reading the value of the A bit and the value of B bit in the servo field corresponding to the position of the read element where the first average value is equal to the second average value;

generating a servo position value based on the difference between the value of the A bit and the value of the B bit;

generating a servo position offset value based on the difference between the servo position value and half the track width value of the second track; and storing the servo position offset value in a memory device.

22. The method as recited in claim 21, further comprising:
moving the read element in accordance with the servo position offset value.

* * * * *